United States Patent [19]
Keller

[11] Patent Number: 5,450,505
[45] Date of Patent: Sep. 12, 1995

[54] CONSTRUCTION AND RECONSTRUCTION OF PROBE MICROSCOPE IMAGES BY FUNCTION ENVELOPE METHODS

[75] Inventor: David Keller, Albuquerque, N. Mex.

[73] Assignee: University of New Mexico, Albuquerque, N. Mex.

[21] Appl. No.: 972,703

[22] Filed: Nov. 6, 1992

[51] Int. Cl.$^6$ ............................................. G06K 9/00
[52] U.S. Cl. ................................... 382/140; 33/556; 250/310; 382/199
[58] Field of Search ...................... 382/8, 22; 250/234, 250/306, 310; 33/556, 533

[56] References Cited

U.S. PATENT DOCUMENTS

| | | | |
|---|---|---|---|
| 5,133,601 | 7/1992 | Cohen et al. | 382/8 |
| 5,148,026 | 9/1992 | Watanabe | 250/306 |
| 5,148,027 | 9/1992 | Umemura et al. | 250/306 |
| 5,204,531 | 4/1993 | Elings et al. | 250/306 |
| 5,210,410 | 5/1993 | Barrett | 250/306 |

*Primary Examiner*—Joseph Mancuso
*Attorney, Agent, or Firm*—Albert Sopp; Robert W. Becker

[57] ABSTRACT

An invention provides an arrangement for accomplishing three objects. The first is correcting distortions caused by probe geometry in probe microscope or profilometer data. The second is calculating apparent probe data from models. The third is deducing the shape of the probe tip from a standard or reference sample. The correction of distorted images data is done by mathematically placing one or more known or hypothetical tip surfaces at one or more points of the distorted image surface to provide a reconstructed surface, which is the envelope surface formed by all such tip surfaces. The calculation of probe microscope image data from one or more mathematical models of sample surfaces is done by mathematically placing one or more known or hypothetical inverted probe tip surface at one or more points on the mathematical model surface, and taking the image surface to be the envelope formed by all such tip surfaces. The deduction of probe tip shape from an image of a known standard or reference surface at one or more points of the image surface, and taking the probe tip surface to be the envelope of all such standard or reference surfaces.

7 Claims, 4 Drawing Sheets

CONSTRUCTION AND RECONSTRUCTION OF PROBE MICROSCOPE IMAGES BY FUNCTION ENVELOPE METHODS

FIELD OF THE INVENTION

This invention is in the field of probe microscopy and profilometry.

BACKGROUND OF THE INVENTION

In previous efforts a complete but unwieldy theory has been developed to account for and correct distortions in probe microscope or profilometer data (R. Chicon, M. Ortuno, and J. Abellan Surface Science vol. 181, p. 107ff (1987), P. Niedermann and O. Fischer, Journal of Microscopy vol. 152, p. 93ff (1988), G. Riess, F. Schneider, J. Vancea, and H. Hoffmann Applied Physics Letters vol. 57, p867ff (1990), D. Keller, Surface Science vol. 253, p. 353ff (1991), see attached reprint 1). In these prior efforts, corrections to the experimentally gathered data are computed (in the most general case) with Legendre transforms (or something equivalent) of the image and tip surfaces. Legendre transforms require numerical derivatives of the data, which are notoriously sensitive to noise.

It is possible in principle to remove some of this noise by standard smoothing techniques. But smoothing eliminates all the sharp features in an image, and in the case of probe images, certain types of sharp features are crucial to provision of accurate and correct reconstruction. As a result, even minimal smoothing tends to cause false reconstructions. Also, experience has been that very strong smoothing is often needed to reduce the noise enough to allow meaningful reconstruction.

As a result, relatively few applications of the previous approaches have been attempted, and these have provided data from relatively large samples where noise is minimized. The new arrangement of the present invention does not require the use of Legendre transforms or numerical derivatives, and is very insensitive to noise. When reconstructions using both the prior methods and the arrangement of the present invention are compared, the arrangement of the invention provides superior results, even in cases where noise is low.

SUMMARY OF THE INVENTION

This invention relates to image processing and reconstruction, and more particularly to the processing of images formed with a probe tip, such as probe microscope profiles and images (e.g., from Scanning Force Microscopy and Scanning Tunneling Microscopy) and profilometer profiles and images. As used herein "image" means any such probe-generated data, consisting of a surface height, $z(x, y)$, at a location $x, y$.

Specifically, the invention provides an arrangement for accomplishing three objects. The first is correcting the distortions that always accompany probe data as a result of the probe geometry, the second is generating artificial probe data from models for comparison and interpretation of actual data, and the third is deducing the tip surface from data gathered from a known reference or standard sample. The present invention provides an important advantage over prior methods in that the prior methods are very sensitive to noise, which greatly limits their application. The present invention provides an arrangement that is insensitive to noise, allowing application to a much broader range of data.

BRIEF DESCRIPTION OF THE FIGURES

The file of this patent contains at least one drawing executed in color. Copies of this patent with color drawings will be provided by the Patent and Trademark Office upon request and payment of the necessary fee.

Reference is now made to the figures in which like reference numerals refer to like parts and in which.

DETAILED DESCRIPTION OF THE INVENTION

As used herein the term "sample surface" means the actual, undistorted surface of the sample, the term "image surface" means a set of data collected from the sample by a probe microscope or profilometer, the term "tip surface" means the actual, undistorted surface of the probe tip used to collect the image surface, and the term "reconstructed surface" means the surface generated from, the image surface by use of the present invention or a prior method.

Figure 1:
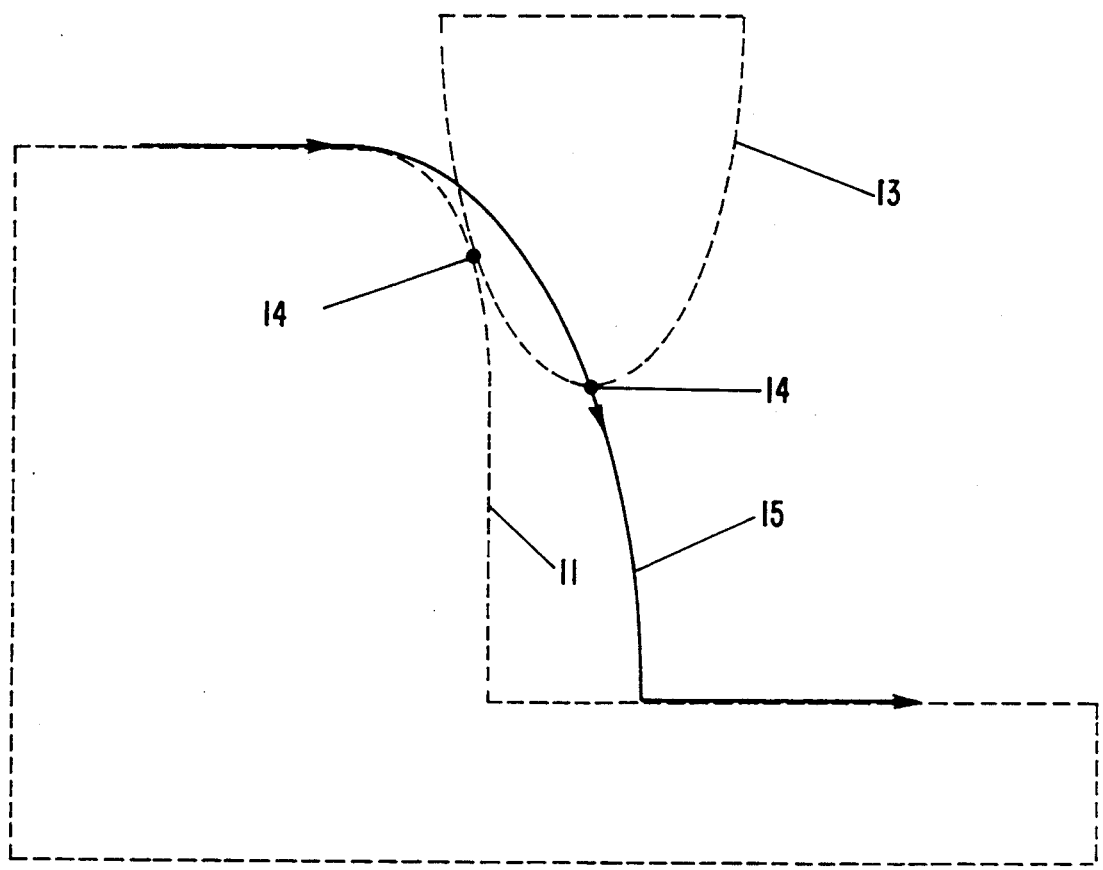
FIG. 1 is a diagramatic view of a sample surface and probe.

Referring to FIG. 1, a probe microscope or a profilometer forms an image of a sample surface 11 by moving a probe tip or probe tip surface 13 over the sample and sensing some type of interaction between the sample and the tip (for example, force of contact or tunneling current) at each point. The probe tip 13 has an apparent point of contact 14 and an actual point of contact 14a. The actual point of contact 14a changes as the tip moves over the surface, but the apparent point of contact 14 is fixed with respect to the tip 13. The result is an image surface 15 different from the actual surface 11 of the sample. The image surface 15 therefore contains distortions that depend on the shape of the probe tip 13.

Figure 2:
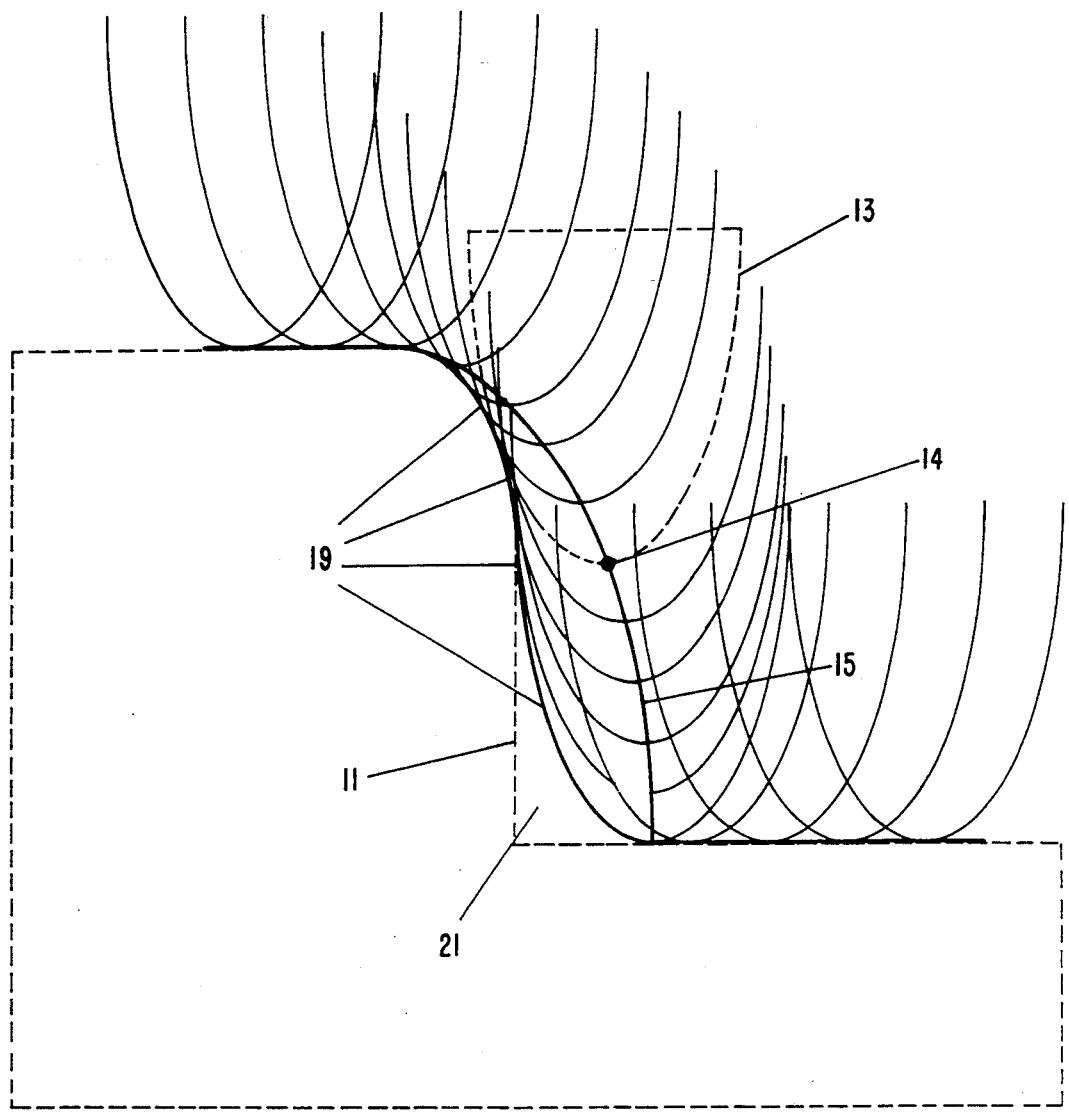
FIG. 2 is a diagramatic view of image and reconstructed surfaces, and the envelope of tip surface functions.

As shown in FIG. 2, in accordance with the present invention there is provided a reconstructed surface 19 which is composed of an outline or envelope produced by a series of probe tip surfaces. It is clear that the reconstructed surface or envelope 19 more closely approximates the sample surface 11 than does the image surface 15.

The arrangement of the invention works as follows. Let the image surface be given by a function, $z(x, y)$, defined in a region R (the image domain space) of the x, y plane. Let the surface of the probe tip 13 be given by a function $t(u, v)$, defined in a region R' (the reconstructed image domain space) of the u, v plane, and assumed to be known a priori. For each pair of points x, y and u, v, define a function $w(u, v; x, y) = z(x, y) + t(u-x, v-y)$. Then the reconstructed surface 19, $r(u, v)$, is the minimum envelope of all functions $w(u, v; x, y)$, that is $$r(u, v) = \text{minimum of the set}\{z(x, y) + t(u-x, v-y), \text{all } x, y \text{ in } R\} \quad (1)$$

for each point u, v in R' (equation 1). The geometric meaning of this definition is shown in FIG. 2 If the data is not a full image, for example, a single trace from a profilometer or a probe microscope, the same definition applies except that the "image" surface depends on only one variable, $z(x, y) = z(x)$, and so is just a special case of the definition above.

Figure 3:
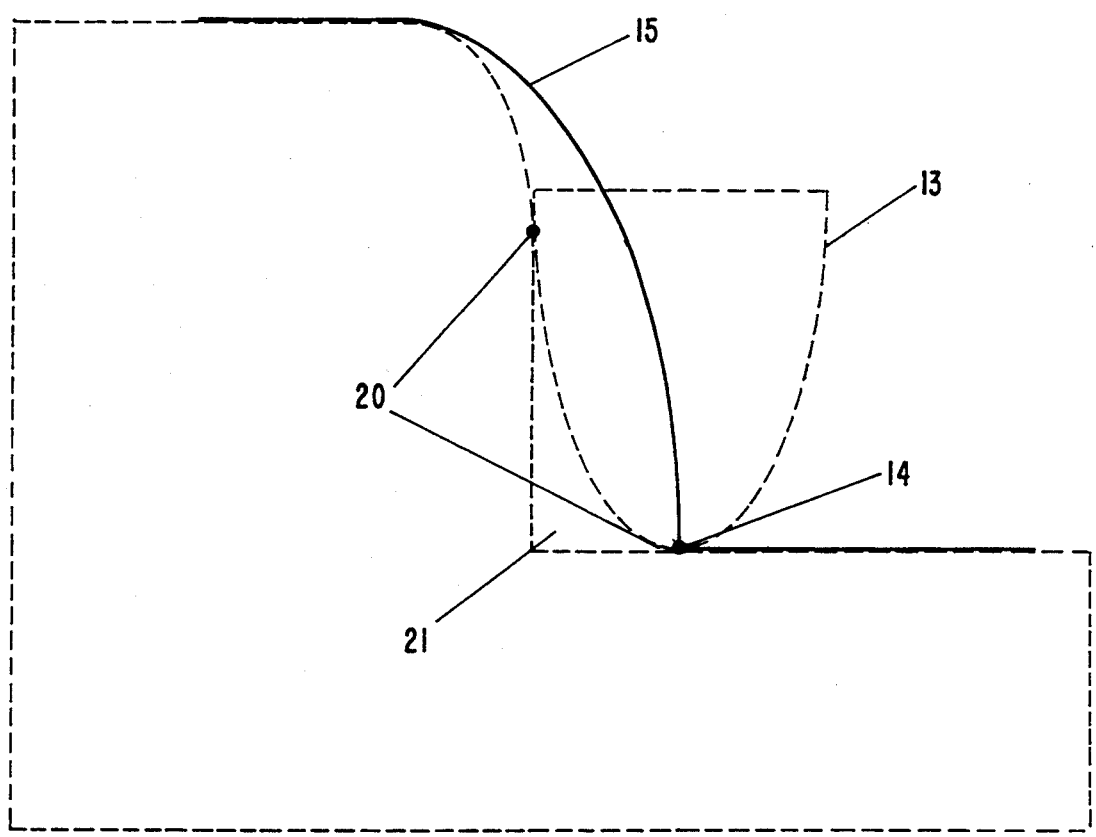
FIG. 3 is a further diagramatic view of probe, tip and image surfaces.

In most probe data there are certain regions ("unreconstructable" regions) that cannot be reconstructed. These occur when the tip makes a multiple contact with the sample, as shown by the points 20 in FIG. 3, where the unreconstructable region between the points 20 is indicated by reference numeral 21. The region between the contacts is never touched by the probe, and so the image surface contains no information about it. In the prior reconstruction methods unreconstructable regions like this were simply left blank, that is, appeared as holes in the reconstructed surface. The new method of the invention fills these holes with a segment of the tip surface (see FIG. 3), that is, with the maximum surface consistent with the data.

It is possible to prove that the reconstructed surface, r(u, v), as defined above, is coincident with the true sample surface, except in unreconstructable regions:

1. By definition, a point $(x, y, z) = (x, y, z(x, y))$ on the image surface means that a defined point on the probe tip (usually taken to be the end of the tip, that is, the lowest point on the tip) was at a height z above the sample at position x, y, and that while at this position, the tip surface function, t(u, v), was somewhere in contact with (that is, tangent to) the sample surface.
2. Therefore each point on the image surface can be associated with a tip surface translated to a position x, y and raised to a height z. Such a translated tip surface can be represented by a function $w(x, y; u, v) = z(x, y) + t(u-x, v-y)$.
3. In general the contact point is not at (x, y, z). Let the point of contact be (u', v', r), where u', v' is the position of contact in the x y plane and r is the height of the contact point above the plane.

The foregoing points in numbered paragraphs 1., 2., and 3 above apply to these cases:

Case 1: Regions of single contact.
1. At points outside regions of multiple contact the tip and sample are tangent at one and only one point, and for each point (u', v', r) on the sample surface there is one and only one tip surface, w(x, y, u', v'), tangent to the sample.
2. At the point of contact the tangent tip surface (hereafter referred to as the "minimum tip surface") must have a z value be, low the z values of all other tip surfaces, since any tip surface with z value below the tangent surface would be below the true sample surface. Then for each point (u', v', r) on the sample surface the tip surface, w(x, y; u', v'), which is tangent to the sample, that is, for which r=w(x, y, u', v'), is the surface whose value is minimum over all x, y at u', v'.
3. Therefore, the set of points {(u, v, r)=(u, v, minimum of the set{w(x, y; u, v), all x, y in R}), all u, v} is coincident with, the surface of the sample.

Case 2: Regions of multiple contact.
Regions enclosed by points of multiple contact (FIG. 3), where the tip bridges a finite portion of the sample without touching the surface beneath, are represented in the image data by a single point. Therefore these regions cannot be reconstructed. A single point in the image data corresponds to a single tip surface. Let this single point be $(x_o, y_o, z_o)$ and let the tip surface placed at that point be $w_o = w(x_o, y_o; u, v)$, where, as before, $w(x_o, y_o; u, v) = z(x_o, y_o) + t(u-x_o, v-y_o)$. By definition, this tip surface will be tangent to the sample surface at multiple points. By the same reasoning as in paragraph 2. in case 1 above, this must be a minimum tip surface for each of those tangent points. In the reconstructed surface therefore, the region enclosed by multiple ,contacts will be represented by a segment of the surface $w_o$ which bridges the true surface exactly as the original tip did.

To calculate an image surface from a mathematical model (that is to add the distortions created by the tip to a mathematical model sample surface), let r(x, y) be the model surface, defined in a region R of the x, y plane, and t(u, v) the tip surface, defined in a region R' of the u, v plane. Then the apparent image surface, z(u, v) is the maximum envelope of the functions w'(x, y; u, v)=r(x, y)−t(x-u, y-v), that is, $$z(u, v) = \text{maximum of the set}\{r(x, y) - t(x-u, y-v), \text{all } x, y \text{ in } R\} \quad (2)$$

for all u, v in R' (equation 2). Note that the arguments of the tip function, t(x-u, y-v), are the negatives of what they were in the previous definition (and in the following definition), and that it is the maximum envelope which must be found rather than the minimum. Image surfaces created in this way can be compared directly to experimentally acquired images or profiles, and are therefore useful for interpretion of data.

To deduce the shape of a probe tip from an image of a known standard sample, let z(x, y) be the image surface, defined in a region R of the x, y plane. Let r(u, v) be the (known) surface of the reference sample, defined in a region R' of the u, v plane. Then the tip surface, t(u, v), is given by the minimum envelope of the functions w''(x, y; u, v)=z(x, y)−r(u-x, v-y), that is $$-t(u, v) = \text{minimum of the set}\{z(x, y) - r(u-x, v-y), \text{all } x, y \text{ in } R\} \quad (3)$$

for all u, v in R' (equation 3). The tip surface generated in this way will be inverted (hence the minus sign on t(u, v)). Only the portion of the tip which comes into contact with the reference sample will be reconstructed.

The function z(u, v) defined in equation 2 and the function t(u, v) defined in equation 3 can be proven to be coincident with the image surface and the tip surface, respectively, in a way similar to the proof for r(u, v), the reconstructed surface defined in equation 1.

The invention may be embodied in algorithms for real-time or offline data processing. The following is an example of a basic algorithm for image reconstruction:

The first steps are to store the tip surface function, t(u, v), as a matrix in a computer memory by assigning a value t(u, v) to each matrix location u, v. Then allocate in the computer memory a matrix for storing the reconstructed image function, r(u, v). Initialize r(u, v) by assigning to each matrix location a value higher than any z value in the image surface.

The next step is to acquire an image data point (that is, an image surface z value) for a particular x and y, z(x, y). For real-time algorithms this would be a value measured by the instrument at a given instant. For off-line data processing this would be a previously stored value.

Next, copy the values stored in t(u, v) into the matrix r(u, v) in such a way that the center of the t(u, v)matrix is shifted to the point u=x, v=y (that is, copy t(u-x, v-y) into r(u, v)). As each value is copied: a) add the value z(x, y) to it and, b) compare the resulting value, w(x, y; u, v)=z(x, y)+t(u-x, v-y) to r(u, v), the value already stored in r at u, v. If r(u, v) is greater than w(x, y; u, v), replace r with w. Otherwise leave r unchanged. Thus the value finally stored in r(u, v) after all values in z(x, y) have been considered is the minimum value of w(x, y; u, v), as in the definition above. These step are repeated for all points x, y.

Similar algorithms can be defined for calculating a probe image from a model surface and for deducing the tip shape from an image of a known sample.

EXAMPLE

Figure 4A:
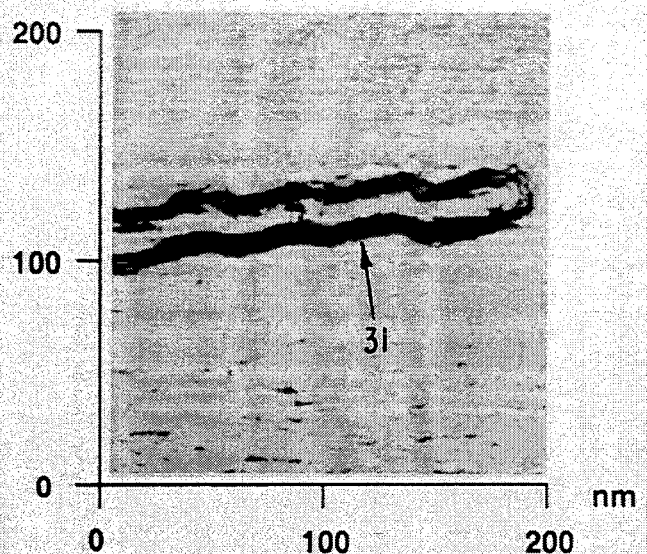
FIG. 4a is a photograph of a probe microscope, image of an actin molecule adsorbed to a mica surface.

The following example sets forth the working of the invention in actual practice. It involves the following set-up:

A c-language computer program was written following the algorithm above and applied to a Scanning Force Microscope (,SFM) image of an actin molecule adsorbed to a mica surface. FIG. 4a is a photograph of an SFM image of an actin molecule indicated by the reference number 31. The actin molecule 31 as shown in FIG. 4a is broadened in its lateral dimensions and otherwise distorted by tip effects. The image in FIG. 4a has also been smoothed to remove high frequency noise present in the original data.

Figure 4B:
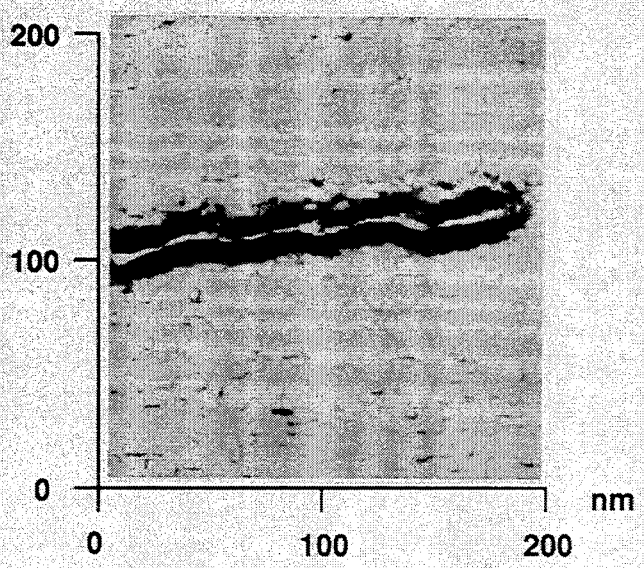
FIG. 4b is a photograph of a reconstructed image generated from the image in FIG. 4a using the present invention.

FIG. 4b is a photograph of an image created by reconstruction of the data represented in FIG. 4a using the method of the invention. Though the photograph in FIG. 4a is of smoothed data, the reconstructed image in FIG. 4b was calculated using the original, unsmoothed data, to avoid the loss of information caused by smoothing The shape of the tip used to collect the data represented in FIG. 4a was not known with certainty and was approximated by a parabola of revolution with end radius of curvature of 10 nm. Comparing FIG. 4a and FIG. 4b, it is clear that some of the lateral, cross-sectional broadening and distortion have been removed by the method of the invention.

Figure 4C:
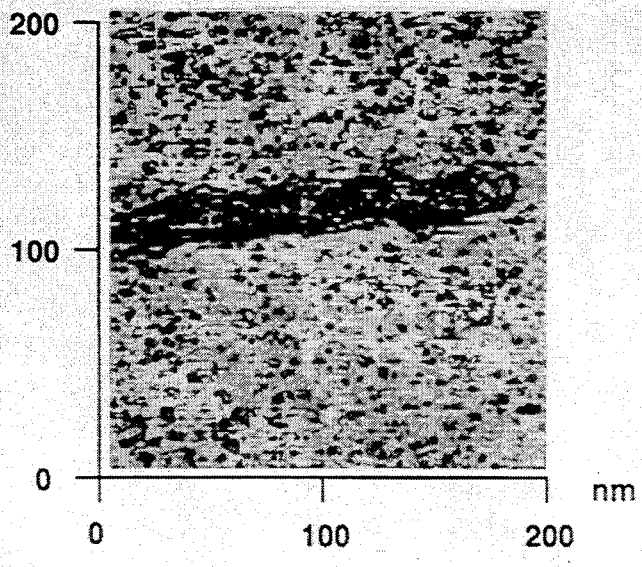
FIG. 4c is a photograph of a reconstructed image generated from the image in FIG. 4a using a prior art method.

FIG. 4c is a photograph of an image created by reconstruction of the data in FIG. 4a using the best prior art method. Again, the reconstruction was carried out using unsmoothed data. The jumbled appearance of FIG. 4c is the result of the sensitivity to noise of the prior part methods. By contrast, FIG. 4b shows a well defined surface, despite the noise in the original image.

I claim:

1. A method of reducing distortions in probe microscope image surfaces and profilometer image surfaces of a sample, comprising the steps of:
    a) moving a probe tip of a probe microscope or a profilometer over a sample surface sensing an interaction between the sample and the probe tip in the form of image data points of the image surface;
    b) generating at least one mathematical function related to the particular geometry of the probe tip surface;
    c) placing said at least one mathematical function at each of said image data points to produce an envelope function from said at least one mathematical function, and
    d) producing from said envelope function reconstructed image data points forming a reconstructed image surface in a manner essentially free from distortion.

2. The method of claim 1 wherein said reconstructed image data points represent a line connecting essentially all points at which a single point on the probe tip surface touches the sample surface, thereby representing the minimum envelope function of all of said mathematical functions.

3. The method of claim 1 wherein for a portion of said sample surface lying between multiple points of contact with the probe tip surface, said reconstructed image data points are the maximum envelope function of all of said mathematical functions.

4. A method of determining the shape of a probe tip surface of a probe microscope or a profilometer, comprising the steps of:
    a) generating a first mathematical function of a known standard sample;
    b) moving a probe tip, the shape of which is to be determined, of a probe microscope or a profilometer over a sample surface and sensing an interaction between the standard sample and said probe tip in the form of image data points of the image surface;
    c) placing said first mathematical function at all of said image data points to produce an envelope function from said first mathematical function, and
    d) determining from said envelope function data points corresponding to the shape of said probe tip.

5. A method according to claim 4, wherein probe microscope image surface data from a mathematical model of sample surfaces are calculated, further comprising, after determining the shape of said probe tip, the steps of:
    a) mathematically placing a second mathematical function of said probe tip as an inverted shape at points on a mathematical model surface,
    b) deriving an envelope function at said points on said mathematical model surface from said placed second mathematical function, and
    c) calculating the image surface of the model as the envelope of said placed second mathematical function.

6. The method of claim 5 wherein the output data represents a line connecting essentially all points at which a single point on the probe tip surface touches the sample surface, thereby representing the minimum envelope of all of said functions.

7. The method of claim 4 wherein said data points represent an envelope of points where a portion of the tip surface of said probe tip contacts the standard sample.

* * * * *